US009093850B2

(12) United States Patent
Wang et al.

(10) Patent No.: US 9,093,850 B2
(45) Date of Patent: Jul. 28, 2015

(54) CHARGING DOCK

(71) Applicant: Cheng Uei Precision Industry Co., Ltd., New Taipei (TW)

(72) Inventors: Xiang Wang, Dong-Guan (CN); Guang Li Huang, Dong-Guan (CN); Wei Hong Liao, Dong-Guan (CN); Yin-Lung Wu, New Taipei (TW)

(73) Assignee: CHENG UEI PRECISION INDUSTRY CO., LTD., New Taipei (TW)

( * ) Notice: Subject to any disclaimer, the term of this patent is extended or adjusted under 35 U.S.C. 154(b) by 233 days.

(21) Appl. No.: 13/923,336

(22) Filed: Jun. 20, 2013

(65) Prior Publication Data

US 2014/0375271 A1  Dec. 25, 2014

(51) Int. Cl.
*H02J 7/00* (2006.01)
(52) U.S. Cl.
CPC .................... *H02J 7/0044* (2013.01)
(58) Field of Classification Search
CPC ..... H02J 7/0044; H02J 7/0045; H02J 7/0042; Y02E 60/12; H01M 10/46; H01M 2/1055; H01M 10/425

USPC ......................................................... 320/115
See application file for complete search history.

(56) References Cited

U.S. PATENT DOCUMENTS

| | | | |
|---|---|---|---|
| 2002/0064041 A1* | 5/2002 | Parker ........................... | 362/183 |
| 2008/0224660 A1* | 9/2008 | Lin et al. ........................ | 320/115 |
| 2009/0121680 A1* | 5/2009 | Kikuchi ......................... | 320/115 |
| 2011/0079701 A1* | 4/2011 | Hayashi et al. ................ | 248/636 |
| 2012/0001048 A1* | 1/2012 | Takahashi et al. ........ | 248/346.03 |

* cited by examiner

*Primary Examiner* — Arun Williams
(74) *Attorney, Agent, or Firm* — Cheng-Ju Chiang

(57) ABSTRACT

A charging dock adapted for charging a hand-held device includes a pedestal defining an opening, an electrical connector, a fastening plate slantwise disposed to a rear of the electrical connector, a plurality of first elastic elements restrained between the pedestal and the insulating housing, a metal braking piece disposed to a bottom of the pedestal, and a plurality of second elastic elements respectively restrained between button caps and the pedestal. The electrical connector is telescopically and slantwise disposed to the bottom of the pedestal and partially projects in or out of the opening. The hand-held device is capable of pressing on or being apart away from the button caps to make the button caps stretch out or draw back to drive the attaching portions to be attached to or apart away from the magnetic elements under the elasticity function of the second elastic elements.

11 Claims, 8 Drawing Sheets

US 9,093,850 B2

CHARGING DOCK

BACKGROUND OF THE INVENTION

1. Field of the Invention

The present invention generally relates to a charging dock, and more particularly to a charging dock adapted for charging a hand-held device which includes a magnetic connector.

2. The Related Art

Currently, with the rapid development of science and technology, more and more electronic products are developed to satisfy people's various requirements. A charging dock as a charging device has been widely used in our daily life. A traditional charging dock which is adapted for charging a hand-held device having a magnetic connector therein includes a pedestal, an electrical connector and two elastic elements disposed between the electrical connector and the pedestal. The pedestal defines an opening. The electrical connector includes an insulating housing, a plurality of conductive terminals received in the insulating housing, and at least one magnetism element disposed to the insulating housing. The electrical connector is telescopically disposed to the pedestal with front ends of the insulating housing and the conductive terminals projecting in or out of the opening. Before the hand-held device is inserted in the charging dock, the front ends of the insulating housing and the conductive terminals project in the opening. When the hand-held device is inserted in the charging dock, the magnetic connector of the hand-held device attracts the front ends of the insulating housing and the conductive terminals to project out of the opening to make the conductive terminals of the electrical connector electrically contact with the magnetic connector of the hand-held device.

However, before the hand-held device is inserted in place, the magnetic connector of the hand-held device attracts the electrical connector to project out of the opening that makes the magnetic connector of the hand-held device rub against the front ends of the insulating housing and the conductive terminals.

SUMMARY OF THE INVENTION

An object of the present invention is to provide a charging dock adapted for charging a hand-held device which includes a magnetic connector. The charging dock includes a pedestal for propping up the hand-held device, an electrical connector, a fastening plate, a plurality of first elastic elements, a metal braking piece, and a plurality of second elastic elements. The pedestal defines an opening. The electrical connector is telescopically and slantwise disposed to a bottom of the pedestal and partially projects in or out of the opening. The electrical connector includes an insulating housing, a plurality of conductive terminals disposed to the insulating housing to electrically contact with the magnetic connector, and at least one magnetic element disposed in the insulating housing to attract the magnetic connector. The fastening plate is slantwise disposed to a rear of the electrical connector. The first elastic elements are respectively restrained between the pedestal and the insulating housing. The metal braking piece is disposed to the bottom of the pedestal for being apart away from or attached to the electrical connector. The metal braking piece has a base portion, an attaching portion slantwise extending rearward and upward from a rear end of the base portion, and at least one inserting portion slantwise extending frontward and upward from the front end of the base portion to pass through the pedestal. The second elastic elements are worn around front ends of the inserting portions. The front ends of the inserting portions and the second elastic elements are further covered with button caps. The second elastic elements are respectively restrained between the button caps and the pedestal. The hand-held device is capable of pressing on or being apart away from the button caps to make the button caps stretch out or draw back to drive the attaching portions to be attached to or apart away from the magnetic elements of the electrical connector under the elasticity function of the second elastic elements.

As described above, before the hand-held device is inserted in the pedestal, the attaching portion is attached to the magnetic elements tightly by virtue of the magnetic elements of the electrical connector and the attaching portion attracting each other to generate the interaction force therebetween. When the hand-held device is inserted in place, the electrical connector contacts the hand-held device smoothly, and the charging dock charges the hand-held device automatically by virtue of the attaching portion being apart away from the electrical connector, and the magnetic connector of the hand-held device attracting the electrical connector to move forward and upward to drive the insulating housing together with front ends of the conductive terminals to project out of the opening of the pedestal.

BRIEF DESCRIPTION OF THE DRAWINGS

The present invention will be apparent to those skilled in the art by reading the following description, with reference to the attached drawings, in which.

DETAILED DESCRIPTION OF THE PREFERRED EMBODIMENT

Figure 1:
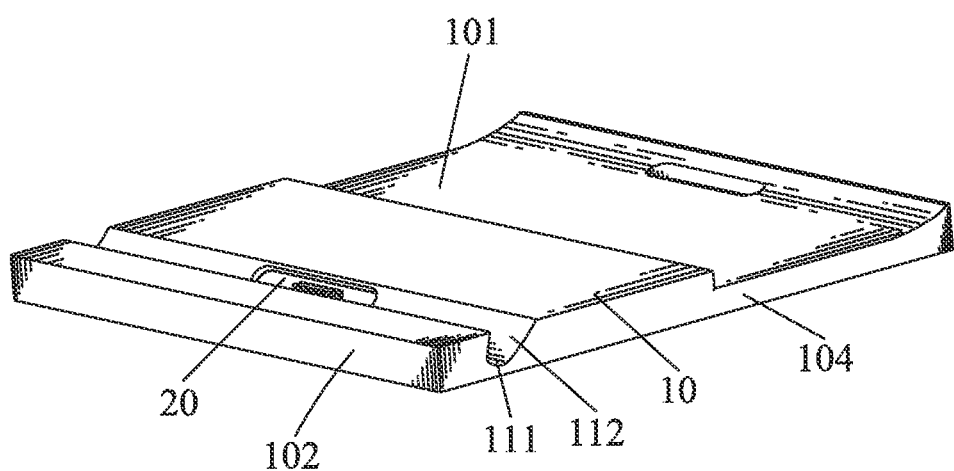
FIG. 1 is a perspective view of a charging dock in accordance with the present invention.
Figure 2:
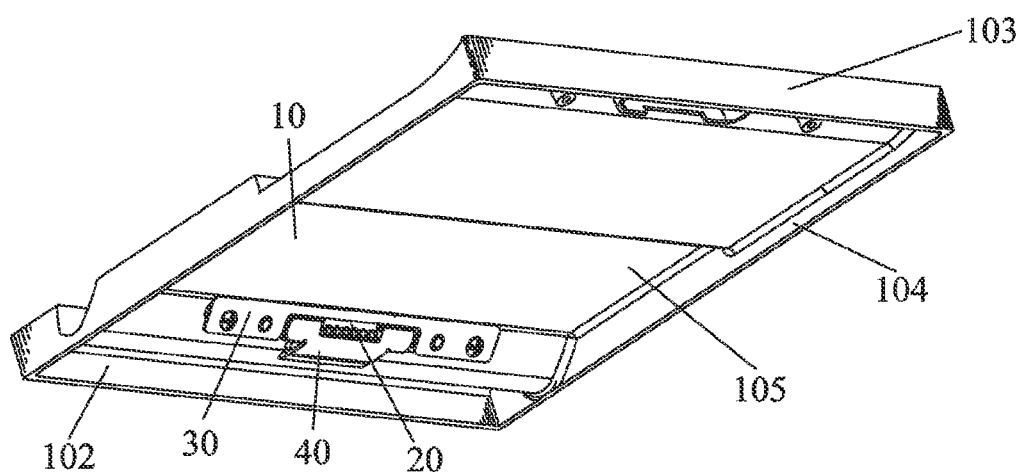
FIG. 2 is another perspective view of the charging dock of FIG. 1.

With reference to FIG. 1, FIG. 2, FIG. 3, FIG. 4 and FIG. 7, a charging dock 100 in accordance with an embodiment of the present invention is shown. The charging dock 100 in accordance with the embodiment of the present invention is adapted for charging a hand-held device 200 which includes a magnetic connector (not shown), such as a tablet personal computer and a cell phone. The charging dock 100 includes a pedestal 10, an electrical connector 20, a fastening plate 30, a metal braking piece 40, a plurality of first elastic elements 50 and a plurality of second elastic elements 60. In the embodiment, the first elastic element 50 and the second elastic element 60 are springs.

Referring to FIG. 1, FIG. 2, FIG. 3 and FIG. 6, the pedestal 10 for propping up the hand-held device 200 has a top wall 101, a front wall 102 perpendicularly extending downward from a front end of the top wall 101, a rear wall 103 perpendicularly extending downward from a rear end of the top wall 101, and two opposite lateral walls 104 perpendicularly extending downward from two opposite sides of the top wall 101. The top wall 101, the front wall 102, the rear wall 103 and the two lateral walls 104 surround an accommodating space 105 thereamong. A front end of the top wall 101 of the pedestal 10 is recessed downward to form an inserting groove 11 passing through the two lateral walls 104. A bottom sidewall 111 of the inserting groove 11 is shown as an arc shape. A rear of the bottom sidewall 111 slantwise extends rearward and upward to form an inclined sidewall 112. A middle of the inclined sidewall 112 defines an opening 12 penetrating therethrough. A bottom of a rear surface of the inclined sidewall 112 slantwise protrudes rearward and downward to form a protruding lump 13 projecting into the accommodating space 105 and located under the opening 12.

Referring to FIG. 1, FIG. 2, FIG. 3 and FIG. 6, the pedestal 10 defines two avoidance holes 131 penetrating through the inclined sidewall 112 and the protruding lump 13. Two peripheral sidewalls of two front ends of the two avoidance holes 131 are spread outward to form two ring-shaped first receiving grooves 132 respectively communicating with the two avoidance holes 131. Two opposite sides of the protruding lump 13 define two fastening slots 133 penetrating through a bottom surface of the protruding lump 13 and located at two opposite sides of the two avoidance holes 131. A top edge and a bottom edge of the opening 12 respectively protrude perpendicular to the inclined sidewall 112 to form a plurality of blocking ribs 121 projecting into the accommodating space 105. Two opposite sides of a top of the rear surface of the inclined sidewall 112 of the inserting groove 11 of the pedestal 10 define two fastening pillars 14 and two locating pillars 15 which are perpendicular to the inclined sidewall 112 and project into the accommodating space 105. The two locating pillars 15 are spaced from the opening 12 and located between the two fastening pillars 14. The fastening pillar 14 defines a screw hole 141 penetrating through a bottom thereof.

Referring to FIG. 1, FIG. 2, FIG. 3, FIG. 4, FIG. 5 and FIG. 6, the electrical connector 20 is telescopically and slantwise disposed to a bottom of the pedestal 10 and partially projects in or out of the opening 12. The electrical connector 20 includes an insulating housing 21, a plurality of conductive terminals 22 disposed to the insulating housing 21 to electrically contact with the magnetic connector, and at least one magnetic element 23 disposed in the insulating housing 21 to attract the magnetic connector. In this embodiment, the electrical connector 20 includes two magnetic elements 23. Specifically, the insulating housing 21 has a base board 211 and a tongue portion 212 protruding forward from a middle of a front of the base board 211. The insulating housing 21 defines a plurality of terminal grooves 213 penetrating through the base board 211 and the tongue portion 212 along a front-to-rear direction, and two holding grooves 214 penetrating through the base board 211 and the tongue portion 212 along the front-to-rear direction and spaced from the terminal grooves 213. Two opposite sides of the base board 211 define two locating grooves 215 penetrating therethrough along the front-to-rear direction. Two peripheral sidewalls of two front ends of the two locating grooves 215 are spread outward to form two ring-shaped second receiving grooves 216 respectively communicating with the two locating grooves 215. The two first elastic elements 50 are respectively worn around the two locating pillars 15.

The conductive terminals 22 are disposed to the terminal grooves 213 with front ends thereof projecting beyond a front surface of the tongue portion 212 and rear ends thereof projecting behind a rear surface of the base board 211. The two magnetic elements 23 are received in the holding grooves 214. The base board 211 of the insulating housing 21 is disposed to the rear surface of the inclined sidewall 112. The tongue portion 212 is telescopically exposed in the opening 12 and restricted between the blocking ribs 121 of the pedestal 10. The two first elastic elements 50 are respectively restrained between the pedestal 10 and the insulating housing 21. The two first elastic elements 50 are respectively worn around the two locating pillars 15 with front ends thereof resisting against the rear surface of the inclined sidewall 112 and rear ends thereof resisting against inner sidewalls of the second receiving grooves 216. The two locating pillars 15 respectively pass through the two locating grooves 215 with rear ends thereof being exposed outside from the two locating grooves 215 to guide the tongue portion 212 of the insulating housing 21 of the electrical connector 20 to be telescopically exposed in the opening 12.

Figure 3:
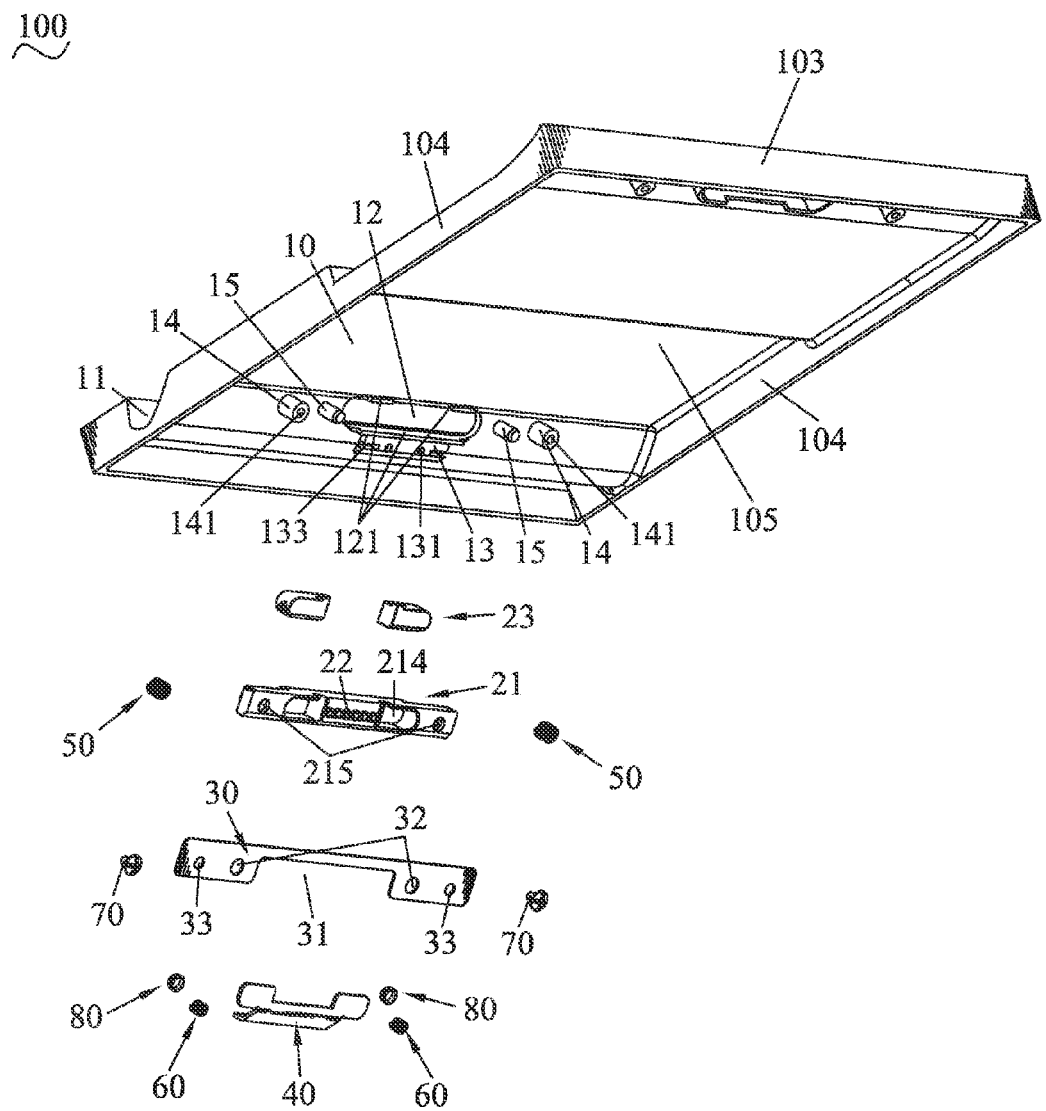
FIG. 3 is an exploded view of the charging dock of FIG. 1.
Figure 4:
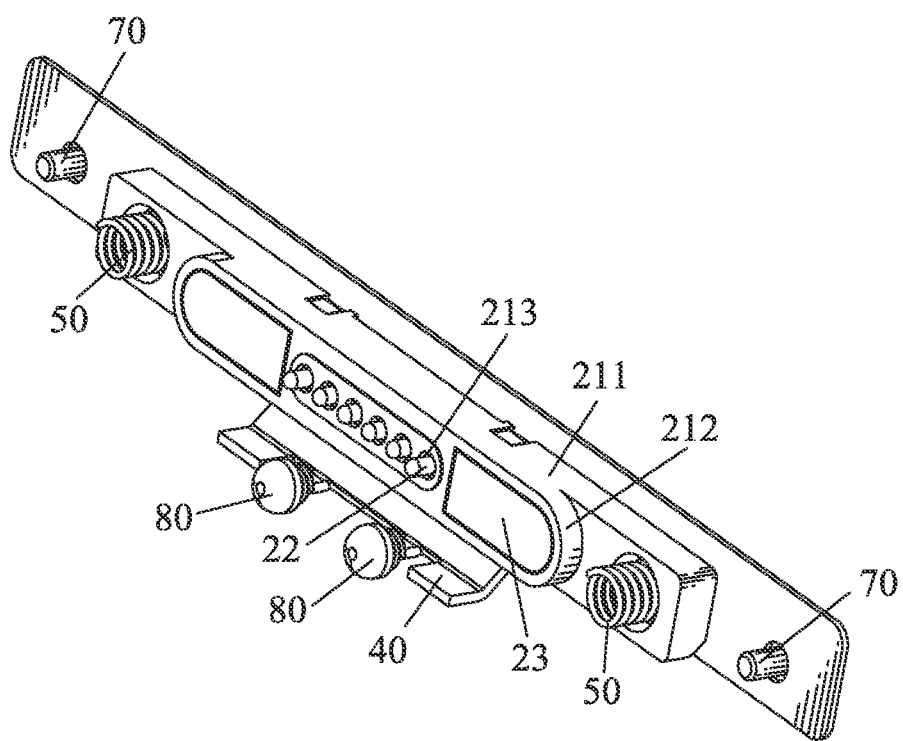
FIG. 4 is a partially perspective view of the charging dock of FIG. 1.
Figure 5:
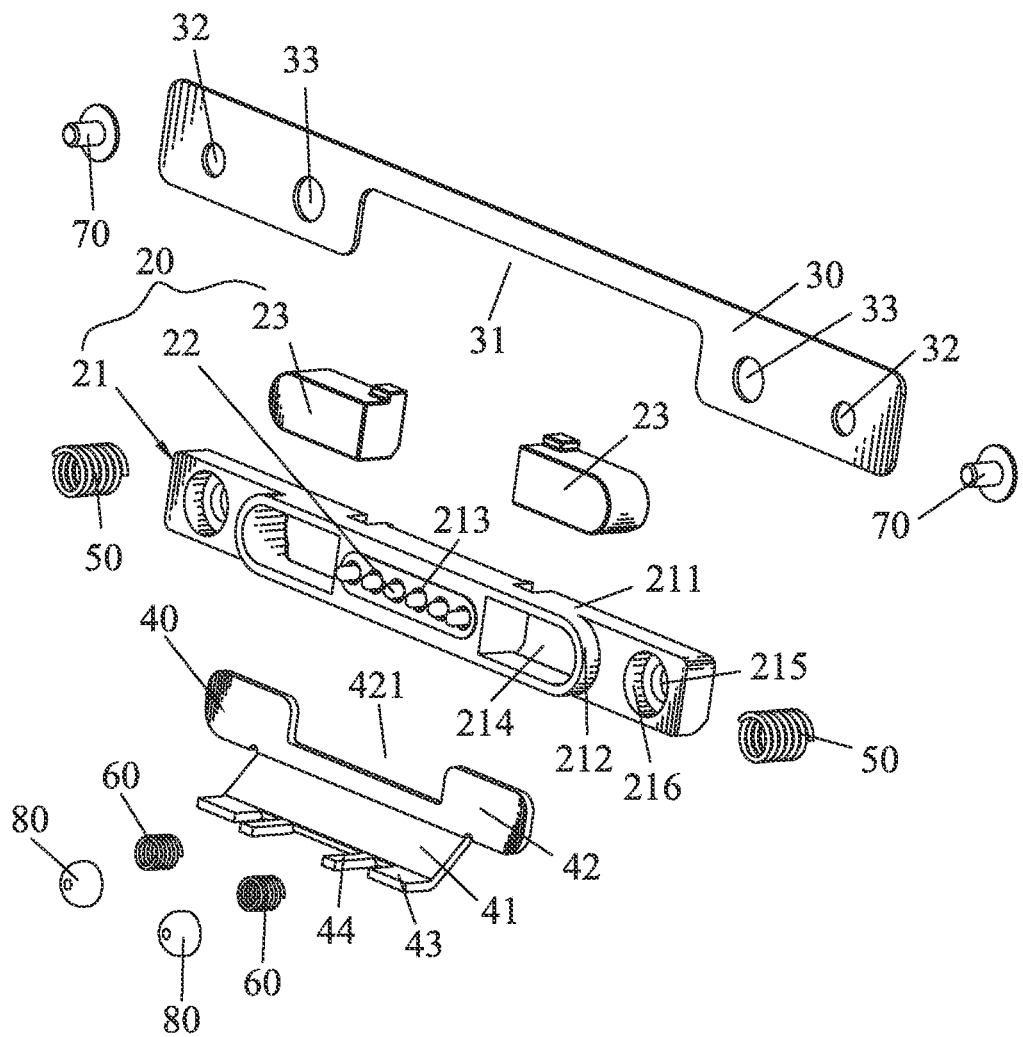
FIG. 5 is a partially exploded view of the charging dock of FIG. 4.
Figure 6:
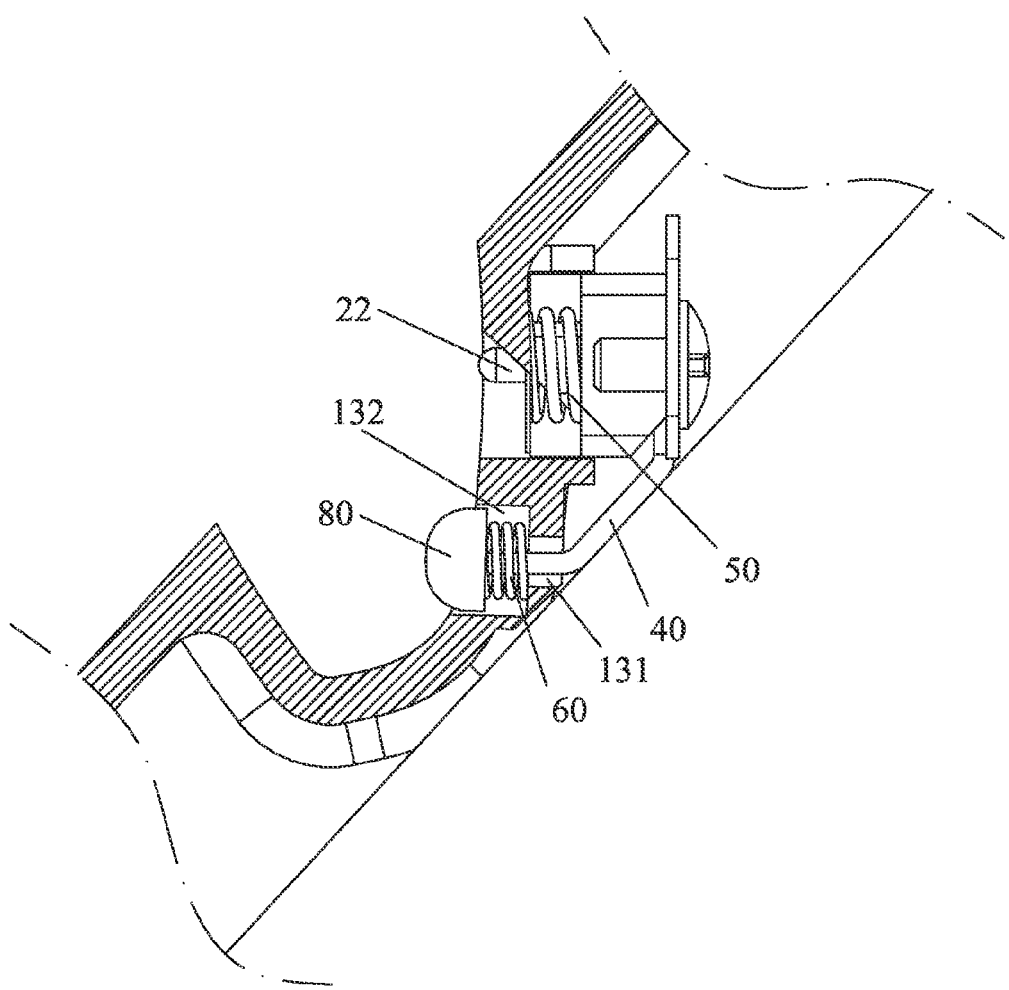
FIG. 6 is a sectional view of the charging dock of FIG. 1.
Figure 7:
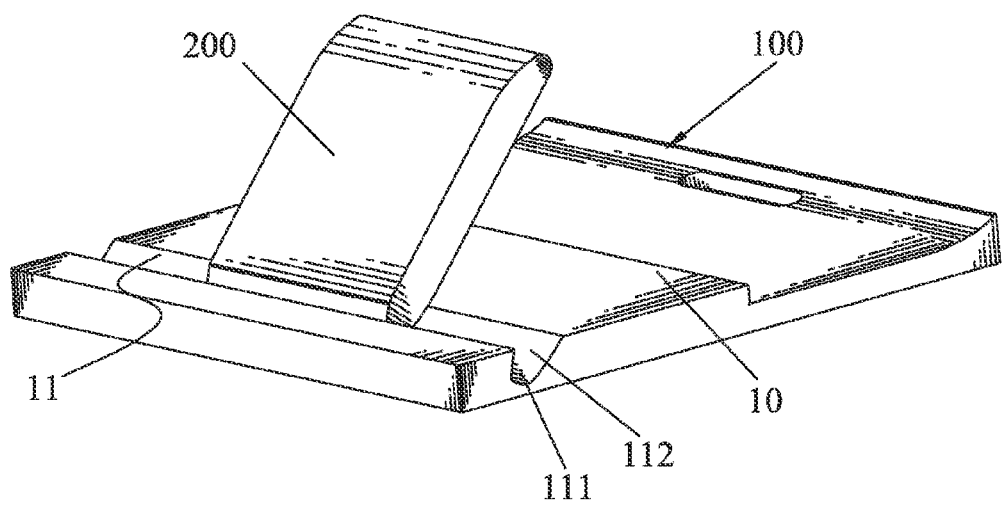
FIG. 7 is a perspective view of the charging dock of FIG. 1, wherein a hand-held device is inserted in the charging dock.
Figure 8:
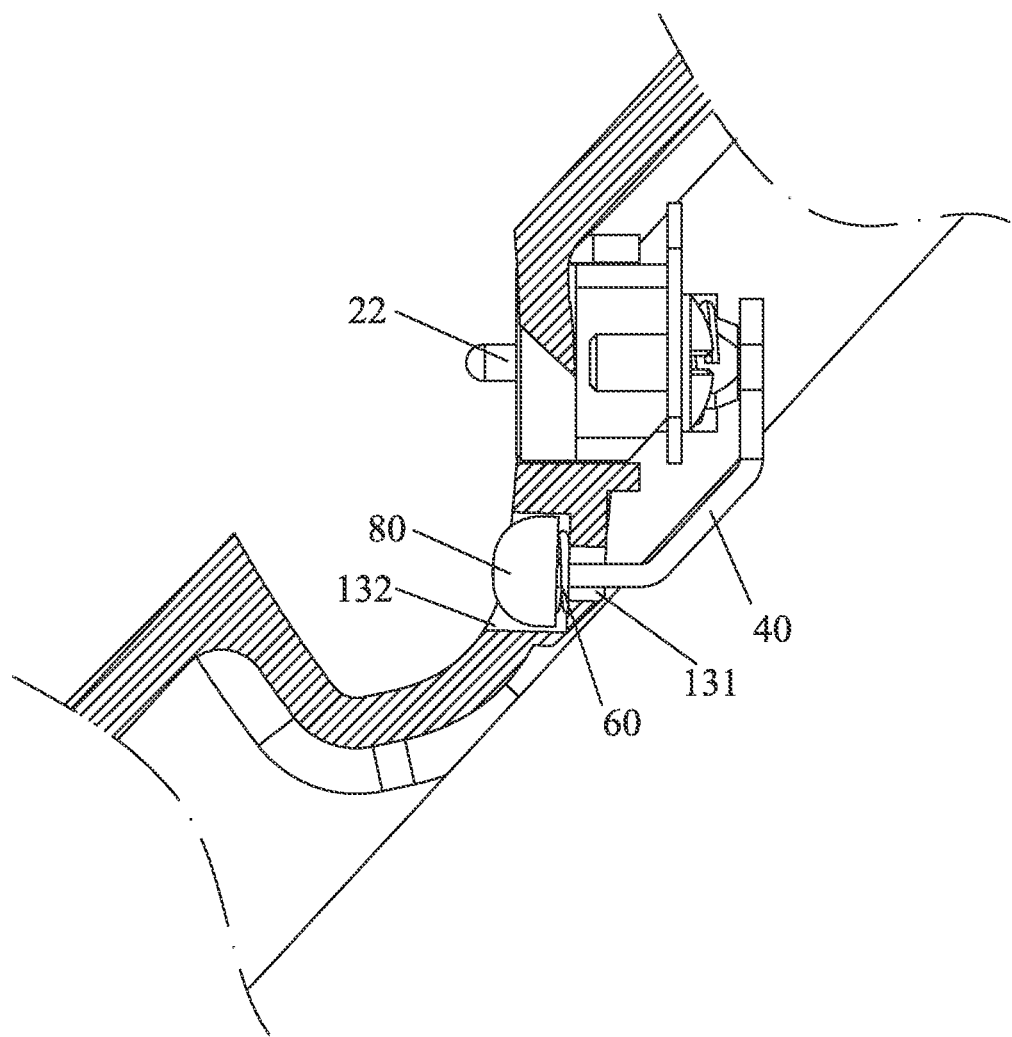
FIG. 8 is a sectional view of the charging dock of FIG. 7, wherein the hand-held device is inserted in the charging dock.

Referring to FIG. 1, FIG. 3 and FIG. 5, the fastening plate 30 is of a strip shape. The fastening plate 30 is slantwise disposed to a rear of the electrical connector 20. The fastening plate 30 defines a first mouth 31 passing through a middle of a bottom thereof. Two opposite sides of the fastening plate 30 define two locating holes 32, and two fastening holes 33 located between the two locating holes 32 and spaced from the first mouth 31. The fastening plate 30 is disposed to a rear surface of the base board 211 of the insulating housing 21. A bottom of a middle of the rear surface of the base board 211 together with the rear ends of the conductive terminals 22 and the magnetic elements 23 is exposed outside from the first mouth 31. The rear ends of the two locating pillars 15 pass through the two locating holes 32. The two fastening holes 33 are corresponding to the screw holes 141 of the two fastening pillars 14. The charging dock 100 further includes two screws 70 screwed in the two screw holes 141 to locate the electrical connector 20 between the inclined sidewall 112 and the fastening plate 30.

Referring to FIG. 3, FIG. 5, FIG. 6 and FIG. 7, the metal braking piece 40 is disposed to the bottom of the pedestal 10 for being apart away from or attached to the electrical connector 20. The metal braking piece 40 has a base portion 41, an attaching portion 42 slantwise extending rearward and upward from a rear end of the base portion 41, two spaced fastening portions 43 slantwise extending frontward and upward from a front end of the base portion 41, and at least one inserting portion 44 slantwise extending frontward and upward from the front end of the base portion 41 and located between the two fastening portions 43. In this embodiment, the metal braking piece 40 has two inserting portions 44. A middle of a top of the attaching portion 42 is recessed downward to form a second mouth 421. The two fastening portions 43 are fastened to the two fastening slots 133. The two inserting portions 44 respectively pass through the avoidance holes 131. The second elastic elements 60 are received in the first receiving grooves 132 and worn around front ends of the two inserting portions 44. The charging dock 100 further includes two button caps 80. The two button caps 80 are covered on the front ends of the two inserting portions 44 and the second elastic elements 60. The second elastic elements 60 are respectively restrained between the button caps 80 and the pedestal 10 with front ends thereof resisting against inner surfaces of the button caps 80 and rear ends thereof resisting against inner sidewalls of the first receiving grooves 132. One end of the button cap 80 is elastically inserted into the first receiving groove 132 and the other end of the button cap 80 elastically projects into the inserting groove 11. The handheld device 200 is capable of pressing on or being apart away from the button caps 80 to make the button caps 80 stretch out or draw back to drive the attaching portions 42 to be attached to or apart away from the magnetic elements 23 of the electrical connector 20 under the elasticity function of the second elastic elements 60. The rear ends of the conductive terminals 22 project in or project out of the second mouth 421 when the attaching portions 42 are attached to or apart away from the magnetic elements 23 of the electrical connector 20.

Referring to FIGS. 1-8, in use, before the hand-held device 200 is inserted in the inserting groove 11 of the pedestal 10, the first elastic elements 50 and the second elastic elements 60 are at releasing statuses. Because the magnetic elements 23 of the electrical connector 20 and the attaching portion 42 attract each other to generate an interaction force therebetween, the attaching portion 42 is attached to the magnetic elements 23 tightly. The fastening plate 30 is disposed to the rear surface of the base board 211 of the insulating housing 21. The tongue portion 212 of the insulating housing 21 of the electrical connector 20 together with the conductive terminals 22 of the electrical connector 20 are located in the opening 12.

Referring to FIGS. 1-8, when the hand-held device 200 is inserted in the inserting groove 11 of the pedestal 10, the hand-held device 200 presses downward and rearward on the button caps 80 to draw back the button caps 80 so as to compress the second elastic elements 60 between the inner surfaces of the button caps 80 and the inner sidewalls of the first receiving grooves 132. The inner surface of the button cap 80 pushes the inserting portion 44 of the metal braking piece 40 to move rearward and downward to drive the metal braking piece 40 to move rearward and downward so as to make the attaching portion 42 apart away from the electrical connector 20. At the moment, the hand-held device 200 is inserted in place, the magnetic connector and the magnetic elements 23 of the electrical connector 20 attract each other, and a magnetic force generated between the magnetic connector and the magnetic elements 23 of the electrical connector 20 is larger than an acting force generated by the first elastic element 50 for pushing and resisting against the electrical connector 20. So that the magnetic connector of the hand-held device 200 attracts the electrical connector 20 to move forward and upward from an original position to drive the tongue portion 212 of the insulating housing 21 of the electrical connector 20 together with the front ends of the conductive terminals 22 of the electrical connector 20 to project out of the opening 12 of the pedestal 10 and compress the first elastic elements 50 between the pedestal 10 and the insulating housing 21. When the hand-held device 200 is inserted in place, the electrical connector 20 contacts the hand-held device 200 smoothly, and the front ends of the conductive terminals 22 electrically contact with the magnetic connector of the hand-held device 200 so as to make the charging dock 100 charge the hand-held device 200 automatically.

Referring to FIGS. 1-8, after the charging dock 100 completes charging the hand-held device 200, take out the hand-held device 200 from the inserting groove 11 of the pedestal 10 of the charging dock 100 to make the hand-held device 200 apart away from the button caps 80 to stretch out the button caps 80. The first elastic elements 50 are released to push and resist against the electrical connector 20 to return to the original position, and the second elastic elements 60 are released to push the button caps 80 to move upward and forward to project out of the first receiving grooves 132. The attaching portions 42 of the metal braking piece 40 are attracted by the magnetic elements 23 of the electrical connector 20 to tightly attach to the electrical connector 20.

As described above, before the hand-held device 200 is inserted in the inserting groove 11 of the pedestal 10, the attaching portion 42 is attached to the magnetic elements 23 tightly by virtue of the magnetic elements 23 of the electrical connector 20 and the attaching portion 42 attracting each other to generate the interaction force therebetween. When the hand-held device 200 is inserted in place, the electrical connector 20 contacts the hand-held device 200 smoothly, and the charging dock 100 charges the hand-held device 200 automatically by virtue of the attaching portion 42 being apart away from the electrical connector 20, and the magnetic connector of the hand-held device 200 attracting the electrical connector 20 to move forward and upward to drive the tongue portion 212 of the insulating housing 21 together with the front ends of the conductive terminals 22 to project out of the opening 12 of the pedestal 10.

What is claimed is:

1. A charging dock adapted for charging a hand-held device which includes a magnetic connector, comprising:
    a pedestal for propping up the hand-held device, the pedestal defining an opening;
    an electrical connector telescopically and slantwise disposed to a bottom of the pedestal and partially projecting in or out of the opening, the electrical connector including an insulating housing, a plurality of conductive terminals disposed to the insulating housing to electrically contact with the magnetic connector, and at least one magnetic element disposed in the insulating housing to attract the magnetic connector;
    a fastening plate slantwise disposed to a rear of the electrical connector;
    a plurality of first elastic elements respectively restrained between the pedestal and the insulating housing;
    a metal braking piece disposed to the bottom of the pedestal for being apart away from or attached to the electrical connector, the metal braking piece having a base portion, an attaching portion slantwise extending rearward and upward from a rear end of the base portion, and at least one inserting portions slantwise extending frontward and upward from the front end of the base portion to pass through the pedestal; and
    a plurality of second elastic elements worn around front ends of the inserting portions, the front ends of the inserting portions and the second elastic elements being further covered with button caps, the second elastic elements being respectively restrained between the button caps and the pedestal;
    wherein the hand-held device is capable of pressing on or being apart away from the button caps to make the button caps stretch out or draw back to drive the attaching portions to be attached to or apart away from the magnetic elements of the electrical connector under the elasticity function of the second elastic elements.

2. The charging dock as claimed in claim 1, wherein the pedestal has a top wall, a front wall, a rear wall and two opposite lateral walls, the top wall, the front wall, the rear wall and the two lateral walls surround an accommodating space thereamong, a front end of the top wall of the pedestal is recessed downward to form an inserting groove passing through the two lateral walls, a bottom sidewall of the inserting groove is shown as an arc shape, a rear of the bottom sidewall slantwise extends rearward and upward to form an inclined sidewall, a middle of the inclined sidewall defines the opening penetrating therethrough, the hand-held device is inserted in the inserting groove.

3. The charging dock as claimed in claim 2, wherein a bottom of a rear surface of the inclined sidewall slantwise protrudes rearward and downward to form a protruding lump projecting into the accommodating space and located under the opening, the pedestal defines two avoidance holes penetrating through the inclined sidewall and the protruding lump, two opposite sides of the protruding lump define two fastening slots penetrating through a bottom surface thereof and located at two opposite sides of the two avoidance holes, the metal braking piece has two inserting portions and two spaced fastening portions slantwise extending frontward and upward from a front end of the base portion, the two fastening portions are fastened to the two fastening slots, and the two inserting portions respectively pass through the avoidance holes.

4. The charging dock as claimed in claim 3, wherein two peripheral sidewalls of two front ends of the two avoidance holes are spread outward to form two ring-shaped first receiving grooves respectively communicating with the two avoidance holes, the second elastic elements are received in the first receiving grooves and worn around the front ends of the two inserting portions, the second elastic elements are respectively restrained between the button caps and the pedestal with front ends thereof resisting against inner surfaces of the button caps and rear ends thereof resisting against inner sidewalls of the first receiving grooves, one end of the button cap is elastically inserted into the first receiving groove and the other end of the button cap elastically projects into the inserting groove.

5. The charging dock as claimed in claim 2, wherein two opposite sides of a top of the rear surface of the inclined sidewall of the inserting groove of the pedestal define two locating pillars, the insulating housing has a base board and a tongue portion protruding forward from a middle of a front of the base board, two opposite sides of the base board define two locating grooves penetrating therethrough along a front-to-rear direction, two peripheral sidewalls of two front ends of the two locating grooves are spread outward to form two ring-shaped second receiving grooves respectively communicating with the two locating grooves, the two first elastic elements are respectively worn around the two locating pillars with front ends thereof resisting against the rear surface of the inclined sidewall and rear ends thereof resisting against inner sidewalls of the second receiving grooves, the base board of the insulating housing is disposed to the rear surface of the inclined sidewall, the tongue portion is telescopically exposed in the opening, the two locating pillars respectively pass through the two locating grooves with rear ends thereof being exposed outside from the two locating grooves to guide the tongue portion to be telescopically exposed in the opening.

6. The charging dock as claimed in claim 5, wherein a top edge and a bottom edge of the opening respectively protrude perpendicular to the inclined sidewall to form a plurality of blocking ribs projecting into the accommodating space, the tongue portion is restricted between the blocking ribs of the pedestal.

7. The charging dock as claimed in claim 5, wherein two opposite sides of a top of the rear surface of the inclined sidewall of the inserting groove of the pedestal define two fastening pillars, the fastening pillar defines a screw hole, two opposite sides of the fastening plate define two locating holes, and two fastening holes located between the two locating holes, the fastening plate is disposed to a rear surface of the base board of the insulating housing, the rear ends of the two locating pillars pass through the two locating holes, the two fastening holes are corresponding to the screw holes, the charging dock further includes two screws screwed in the two screw holes to locate the electrical connector between the inclined sidewall and the fastening plate.

8. The charging dock as claimed in claim 5, wherein the insulating housing defines a plurality of terminal grooves penetrating through the base board and the tongue portion along the front-to-rear direction, the conductive terminals are disposed to the terminal grooves with front ends thereof projecting beyond a front surface of the tongue portion and rear ends thereof projecting behind a rear surface of the base board, when the hand-held device is inserted in place, the front ends of the conductive terminals electrically contact with the magnetic connector of the hand-held device.

9. The charging dock as claimed in claim 8, wherein the insulating housing defines two holding grooves penetrating through the base board and the tongue portion along the front-to-rear direction and spaced from the terminal grooves, the electrical connector includes two magnetic elements received in the holding grooves.

10. The charging dock as claimed in claim 8, wherein the fastening plate defines a first mouth passing through a middle of a bottom thereof, a bottom of a middle of the rear surface of the base board together with the rear ends of the conductive terminals and the magnetic elements is exposed outside from the first mouth.

11. The charging dock as claimed in claim 8, wherein a middle of a top of the attaching portion is recessed downward to form a second mouth, the rear ends of the conductive terminals project in or project out of the second mouth when the attaching portions are attached to or apart away from the magnetic elements of the electrical connector.

* * * * *